United States Patent [19]

Juckett

[11] Patent Number: 4,512,226
[45] Date of Patent: Apr. 23, 1985

[54] SLITTING APPARATUS AND METHOD

[75] Inventor: David W. Juckett, Hudson Falls, N.Y.

[73] Assignee: Sandy Hill Corporation, Hudson Falls, N.Y.

[21] Appl. No.: 519,115

[22] Filed: Aug. 1, 1983

[51] Int. Cl.³ .............................................. B26D 3/12
[52] U.S. Cl. ........................................ 83/56; 65/174; 83/505; 83/659
[58] Field of Search .................. 83/56, 505, 506, 659, 83/922; 65/56, 174–176; 162/120, 194, 286; 264/146; 29/121.3

[56] References Cited

U.S. PATENT DOCUMENTS

| 301,732 | 7/1884 | Lockwood | 29/121.3 X |
| 932,430 | 8/1909 | Berti | 162/286 |
| 1,753,743 | 4/1930 | Drake | 65/175 X |

Primary Examiner—James M. Meister
Attorney, Agent, or Firm—Ross, Ross & Flavin

[57] ABSTRACT

Apparatus for slitting the edges of a wet web as it leaves the forming machine to allow a web of a desired width includes a rotatable perforated tube over which the web is passed, a perforated tube holder adjustably encapsulating each opposite end of the tube and circumscribed by a hardened sleeve and a wire cloth, and a slitting device including a rotatable circular knife positionable relative to the sleeve for the running of the web therebetween.

4 Claims, 5 Drawing Figures

SLITTING APPARATUS AND METHOD

BACKGROUND OF THE INVENTION

There is a need for a slitting apparatus having particular usefulness in the cutting of a glass web or sheet in its wet state before the saturating and/or drying thereof.

A glass web or sheet, conventionally formed, is then usually saturated, dried and cured. Saturated glass sheets cannot be repulped and any trim must be sold as scrap material for inferior products or as pure waste material.

It is altogether obvious that, if dry trimming could be eliminated, significant savings could be achieved, especially inasmuch as the raw material costs are in the area of $0.75/lb. as of this writing, ergo the dictate of a trim apparatus for functioning upon a sheet while in its wet state.

Trimming a sheet made of long fibers, of glass or other synthetic material, must be achieved by means other than by the conventional high pressure needle showers. High pressure water showers do not cut through long fibers and, although the edge or trim can be knocked off, the sheet is not left with a smooth, continuous, straight edge.

SUMMARY OF THE INVENTION

The slitting cutter (the tool) is located at a cutting zone in the path of continuously moving work (the wet web) and whose cutting plane is substantially parallel to the said path and to the direction of movement of the work for constant cutting contact with the work, there being associated means for moving the work to and through the cutting zone for the constant cutting thereof so long as the tool is selectively lowered into operating position.

The word "constant" as used above does not preclude the operation of means to reposition the cutter out of (and thus, also, back into) the cutting zone. The cutting is constant so long as the cutter remains in its cutting position and the work is moved toward and past it.

The work is conveyed relative to the tool station by means not forming a part of the present invention.

The work (the wet web) as envisioned for accommodation to the apparatus hereof will be a web of indeterminate length which is to be slit longitudinally of its length at one or both sides thereof. That is, the cut or cuts will be made parallel to the direction of and during work movement.

In this invention, use is made of the slitter knife and anvil roll technique with a sharp circular knife on each side of the web being pressed down upon and into the moving web which itself is supported by a respective anvil roll.

The trim roll is mounted between the couch roll of the forming element and a saturator lead-in roll and has for its purpose, to trim the opposite edges of the wet glass sheet as it leaves the couch roll.

Adjustment means allow the positioning of the cutting elements in any desired position with respect to the web running therepast so as to allow the trimming of a web to any desired width.

The trimmed material, being wet, is enabled to be recycled into the system before any drying ensues, it having been explained that the trim from a dried and finished product has little value inasmuch as the cured chemicals in the product preclude reuse within the system.

The trim roll is constituted by a wire cloth covered perforated tube with an open area in the order of 45-50% of the total surface area, into which the opposite heads and journals are inserted, the journals being strategically supported by pillow blocks mounted on stands at opposite sides of the running web.

The trim roll perforations allow the introduction of air between the wet web and the trim roll face so as to assist in the web release therefrom as it is being trimmed.

At each end of the roll, a trim anvil in the form of a hardened sleeve is mounted on a removable perforated tube holder, also wire covered, which tube holder is mounted on a respective head.

The trim anvil can be reversed on the roll in order to move the hardened sleeve further inboard relative to the trim roll so as to accommodate to smaller trim widths.

The wet web, normally comprised of about 60% glass fibers and about 40% of water, has the characteristic of sticking to smooth materials, ergo the employment of the wire cloth covering over the perforated tube holder and the perforations in the trim roll.

BRIEF DESCRIPTION OF THE DRAWINGS

In the detailed description of the preferred embodiment of the invention presented below reference is made to the drawings in which.

DESCRIPTION OF THE PREFERRED EMBODIMENT

Figure 1:
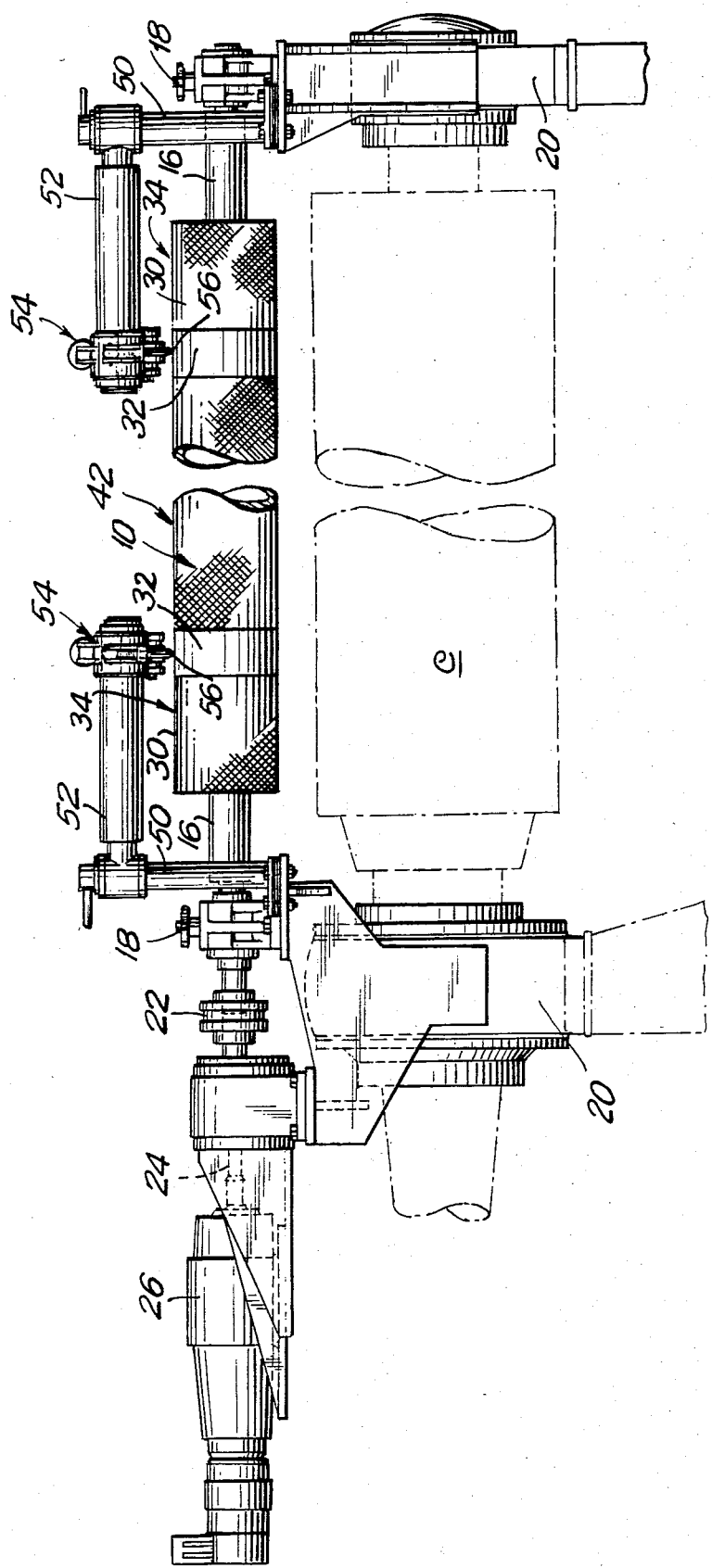
FIG. 1 is a broken front elevational view of the apparatus of the invention and showing the cutter wheels in operating position on the hardened sleeve.
Figure 2:
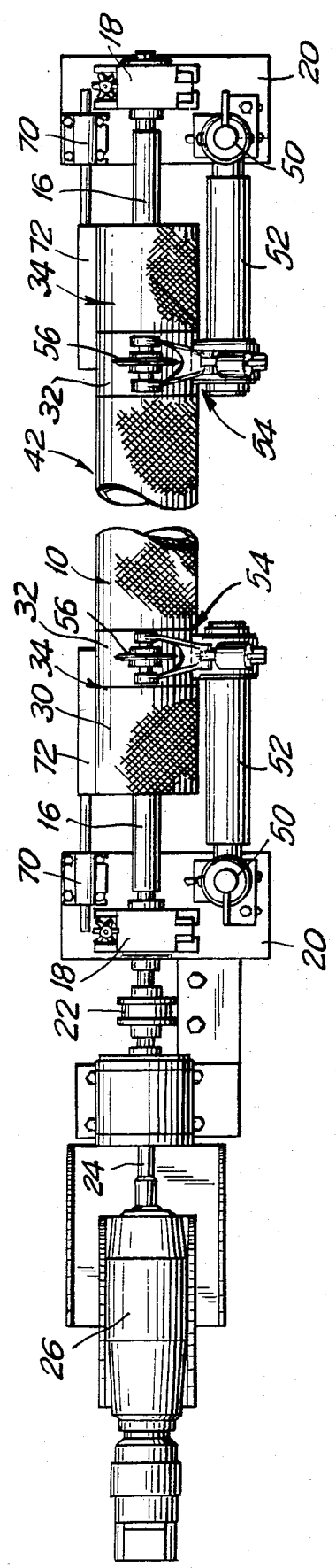
FIG. 2 is a broken view in top plan of the FIG. 1 apparatus.
Figure 3:
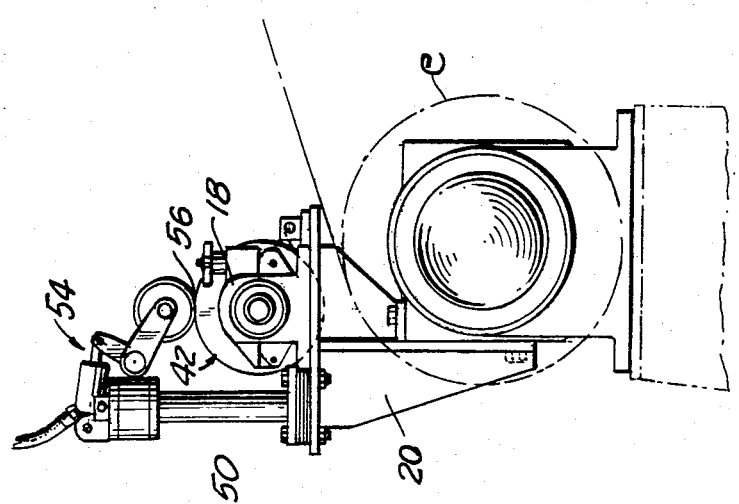
FIG. 3 is a view in side elevation of the FIG. 1 apparatus from the tending side.
Figure 4:
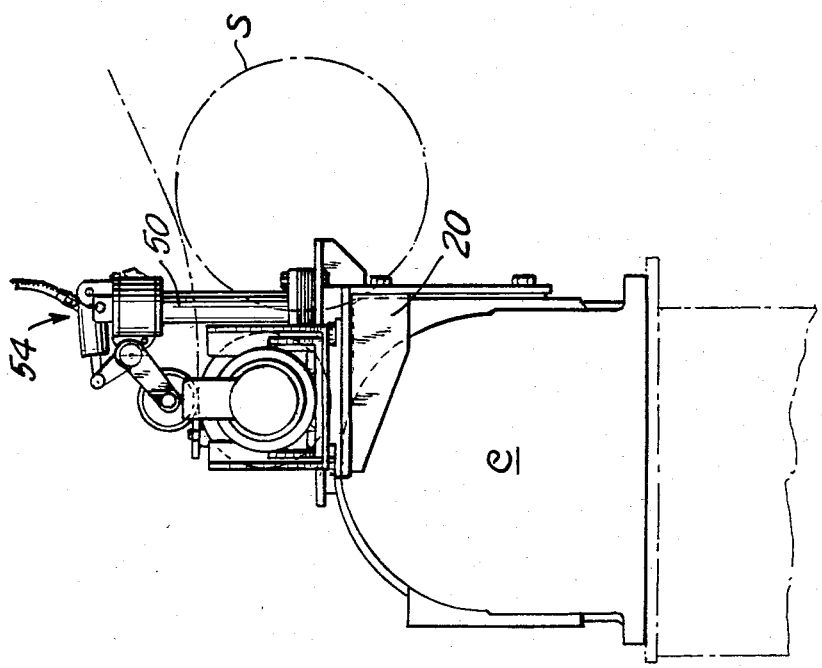
FIG. 4 is a view in side elevation of the FIG. 1 apparatus from the far side.
Figure 5:
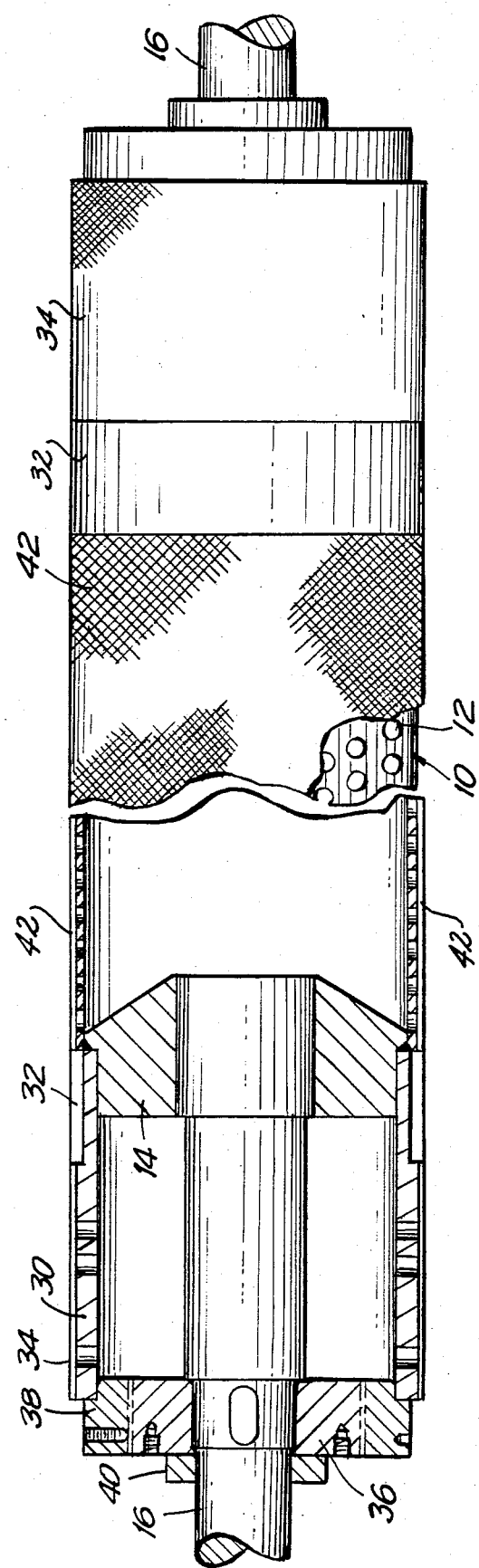
FIG. 5 is a fragmentary view in side elevation, with parts broken away for clarity, of the trim roll assembly showing the inner perforated tube, an end head and journal, an anvil assembly sleeved upon the head at a respective end and the wire cloth over the anvil assembly and over the inner perforated tube.

The trim roll is constituted of a tube 10 having an outside diameter say in the order of 10 inches and perforated with a diamond pattern of through openings 12 each having a diameter in the order of $\frac{3}{4}$ inch, same being arranged throughout the tube area so as to occupy substantially 50% of the entire tube surface area.

A head 14 is nestably receivable in each open end of the tube 10 and a respective journal 16 extends in outboard direction therefrom, the shoulders of which are extended into and supported by respective pillow blocks 18 mounted on and upwardly of respective stands 20 disposed on opposite sides of the machine, which stands are disposed above a couch roll C and inboard of a saturator lead-in roll S.

At the far side, the outer extremity of the journal is coupled by a coupling flange 22 to the drive shaft 24 of a drive unit 26 whereby a rotative motion is imparted to the trim roll.

A trim anvil is sleeved over the respective head at each opposite end of the perforated tube and comprises a hub 30 which may be of any desired length, say in the order of 15 inches which is circumscribed at one end with a hardened sleeve 32 and covered by a wire cloth 34.

The trim anvil is held in situ relative to its respective header by means of an adapter 36 which is keyed to the journal and sleeved within a removable nut 38 and further secured by a collar 40 circumscribing the journal.

A wire cloth 42 is wound around the perforated tube per se.

Mounted on and extending upwardly from each stand is a support 50 which supports against its upper terminal an adjustable inboard-extending arm 52 on the free inner extremity of which a slitter 54 is mounted with the rotatable circular knife 56 thereof being extended downwardly and away therefrom toward and in running contact with the hardened sleeve 32 of the anvil.

A toggle linkage 60 is connected at one terminus to both sides of the axle of the circular knife and is connected at its other terminus to the outboard end of a piston 62 reciprocable within a cylinder 64 which is in communication with an air line 66 whereby the knife may be selectively raised and lowered relative to the webbing served.

Mounted on and extending upwardly from each stack at the side of the pillow block opposite from the support 50 is a wiper housing 70 from which supports an inboard extending wiper 72 for cleaning the anvil.

Thus it can be seen that the slitting cutter is located at a cutting zone in the path of a moving web and whose cutting plane is substantially parallel to the path and to the direction of movement of the work for constant cutting contact with the work, there being associated means for moving the work to and through the cutting zone for the constant cutting of the work.

The work (the wet web) as envisioned for accommodation to the apparatus hereof will be a web of indeterminate length which is to be slit longitudinally of its length at one or both sides thereof. That is, the cut or cuts will be made parallel to the direction of and during work movement.

A conventional anvil roll would not suffice for the instant purpose of slitting a wet glass web in light of the inherent tendency to pick up and tear the web apart.

By the use of the perforations arranged circumferentially around the roll, the discontinuity of the surface negates the tendency to pick up.

The wire cloth covering serves the purpose of discouraging the fiberglass sheet from sticking to the surface of the anvil or the roll as would be the probability in the case of a smooth surfaced member. Too, the perforated trim roll allows the introduction of air between the web and the trim roll face, all so as to further encourage web release therefrom.

Inasmuch as different webs are necessarily trimmed at different widths, the trim anvils can be reversed on the roll in order to position the hardened sleeve to another desired position.

The invention has been described in detail with particular reference to a preferred embodiment, but it will be understood that variations and modifications can be effected within the spirit and scope of the invention as described.

I claim:

1. In apparatus for trimming a wet web comprised of glass or other synthetic fibers, a combination which includes a pair of spaced stands disposed for the continuous running of the web therebetween,
   a rotatable perforated tube journaled relative to the stand over which the wet web is passed,
   a trim anvil in the form of a perforated tube holder encapsulating each opposite end of the tube and having a hardened sleeve and a wire cloth circumscribing the tube holder, a slitting means including a rotatable circular knife positionable relative to the sleeve for the running of the wet web therebetween.

2. A method of trimming a continuously running wet web including the steps of running the wet web relative to spaced opposite stands over a rotatable perforated tube mounting a peripherally arranged hardened sleeve at each opposite end of the tube, and bringing a rotatable circular cutting knife at each side of the tube into severing contact with the wet web and in confronting relationship with the hardened sleeve.

3. Apparatus for slitting the edge of a wet web as it leaves the forming machine in a wet state so as to allow a web of a predetermined width comprising: a pair of spaced stands disposed for the continuous running of the wet web therebetween,
   a rotatable perforated tube journaled relative to the stands over which the wet web is passed,
   a perforated tube holder adjustably encapsulating each opposite end of the tube and circumscribed by a hardened sleeve and a wire cloth,
   a slitting means including a rotatable circular knife positionable relative to the sleeve for the running of the wet web therebetween.

4. In a method of trimming a continuously running wet web, the steps of: running the wet web over a rotatable perforated tube mounting at each end a peripherally arranged hardened sleeve, and driving a rotatable circular cutting knife at each side of the tube into severing contact with the wet web and in confronting relationship with the respective hardened sleeve.

* * * * *